Oct. 15, 1946.  R. D. GUNN  2,409,558
TREATMENT OF GAS
Filed Oct. 27, 1942
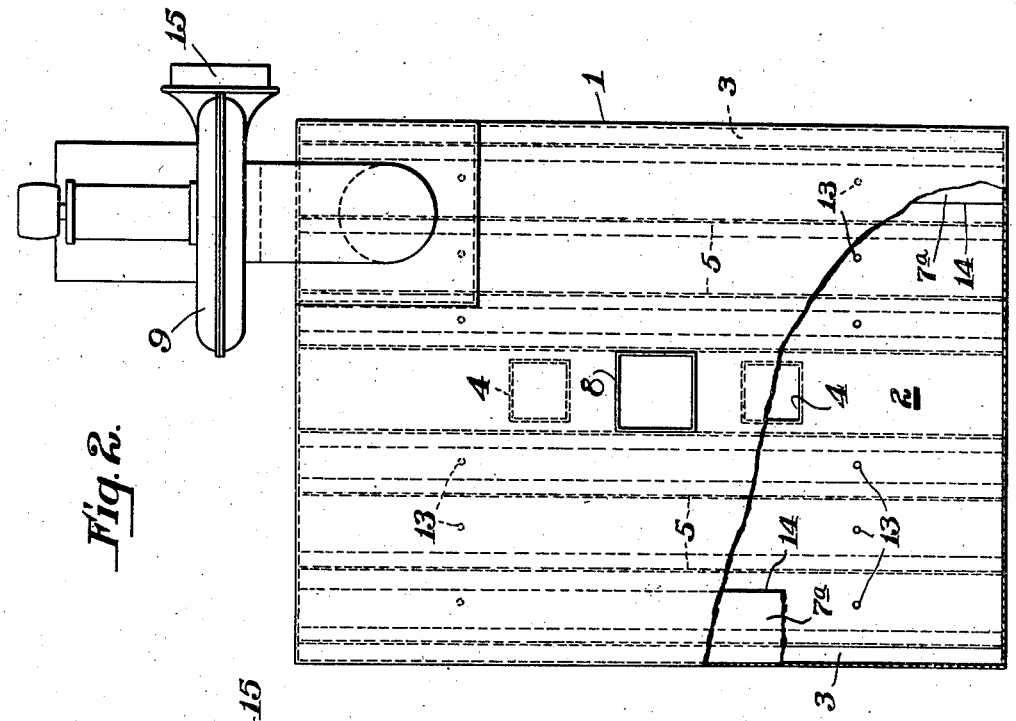
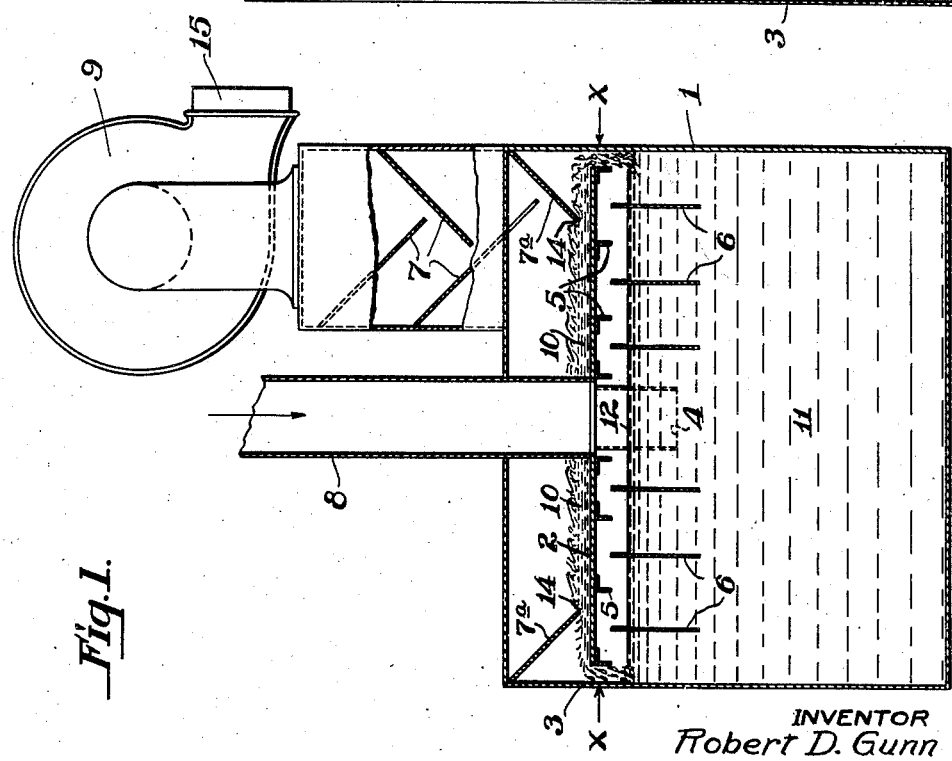
INVENTOR
Robert D. Gunn
BY
ATTORNEY Patented Oct. 15, 1946

2,409,558

UNITED STATES PATENT OFFICE 2,409,558

TREATMENT OF GAS

Robert D. Gunn, Cleveland, Ohio, assignor to Aluminum Company of America, Pittsburgh, Pa., a corporation of Pennsylvania Application October 27, 1942, Serial No. 463,461

9 Claims. (Cl. 183—24)

1

This invention relates to the removal of suspended solid matter from aeroform fluids, such as air and other gases all of which are herein, and in the appended claims, included within the term "gas." To this end the invention provides methods and apparatus particularly useful in the removal of suspended metallic particles from air but generally useful wherever solid matter is desirably removed from gas in which it is suspended.

The general object of the invention is to provide methods and means by which suspended solid matter may be substantially completely removed from the gas in which it is entrained, but the invention likewise has more specific objects such as the prevention of fire or explosion where the gas-solid mixture presents such problems, compactness and simplicity of apparatus employed and low cost operation.

Suspended solid matter is usually removed from gas either for the purpose of purifying the gas or for the purpose of recovering the solid matter as a valuable material. Often both purposes exist simultaneously where both a pure gas and a recovery of solid matter are desired. The present invention is useful to all such purposes.

In the practice of the invention liquid is used as the basic separating medium. Choice of the kind of liquid may be dictated by circumstances, or even by its chemical nature if chemical purification is also desired, but in the usual practice the use of water will be found sufficient. The method of the invention is, basically, two-stage. In the first stage a stream of the gas to be treated is led over a free liquid surface and, in the course of its travel, at least a portion of the gas, preferably all of it, is deflected against this free liquid surface. In the second, and following, stage the thus treated stream of gas is led through, and in intimate contact with, a layer of flowing liquid, the path of travel of the gas stream and the liquid layer being substantially divergent. In a preferred form, the invention includes practicing this two-stage treatment in conjunction with a liquid circuit in which the liquid forming the flowing layer is continuously supplied from the body of liquid which forms the free liquid surface above mentioned. The liquid of the flowing layer may then be disposed of in any manner, but I prefer to continuously return it to the said liquid body from which it came since by thus completely closing this liquid circuit a concentration of the recovered solids may be obtained in the liquid body and the use of large amounts of liquid is also obviated. In a still more specific form, the invention may be practiced to further conserve

2 this liquid by treating the finally processed gas to condense or otherwise remove therefrom at least a portion of the liquid which may have been picked up by the gas during the processing. This liquid condensate may then be returned to the liquid circuit and substantial loss of liquid from the circuit thus prevented. These more specific forms of the invention are highly desirable in many instances but are not necessary to the realization of the main object of separation of gas from solid, this object being realized by practice of the two-stage treatment above described whether the liquid body and the flowing liquid layer be used separately, in partial circuit or in closed circuit.

A description of the method of the invention is conveniently made with reference to the attached drawing which shows, more or less diagrammatically, an apparatus developed and employed by me for removal of metallic particles from the air in which they are suspended. In the drawing, in which like numerals designate like parts, Figure 1 is a vertical sectional view through the apparatus at a time when it is in operation;

Figure 2 is a view partially in section looking downwardly upon the apparatus at a time when it is not in operation.

As shown, the apparatus consists of a shell or box 1 divided by the partition 2 into a lower compartment and an upper chamber. Communication between compartment and chamber is afforded through partition apertures 3 and a plurality of tubes 4. Baffles 5 and 6 run the length of the lower compartment, as shown. Baffles 7 and baffles 7a located in the upper chamber also run the length of that chamber. A means or port for delivering gas to be treated to the lower compartment is afforded by the intake pipe 8. An exhaust blower 9 which communicates with the upper chamber through an exhaust port furnishes means by which treated gas may be evacuated from the device through the exhaust or outlet 15. In the device here shown the blower also serves, as will later be described, to circulate the gas during treatment and the water in the closed water circuit, but other means could conveniently be selected for these purposes.

Prior to operation of the device a body of liquid 11 is placed in the lower compartment in such amount as to form a liquid level at or about the point indicated at X in Figure 1. The intake pipe 8 is attached to a source of gas to be treated and blower 9 is started. The force of the blower, the aperture 3 and the orifice of pipe 8 are so proportioned that the force of the blower tends to continuously lift particles of the liquid body 11 upwardly through apertures 3 into the upper chamber. These liquid particles collect on the partition 2, thus forming on its upper surface and in the lower levels of the chamber a layer 10 of the liquid. This liquid layer is maintained at a predetermined level and flow by means of the pipes 4 which open at their upper end in the partition 2 and at their lower end in the liquid body 11, thus forming a passage by which liquid from the layer is continually returned to the liquid body below by gravity. The effect of this water-raising action is to reduce the level of liquid in the lower compartment to a point such as shown in Figure 1 where the free liquid surface 12 forms one side of a gas passage extending from the pipe 8 to apertures 3. Under the action of the blower the gas stream flows from the pipe 8 through this passage, the direction of its flow being changed at intervals by the liquid-free ends of baffles 6 and by baffles 5. The baffles 5 also serve to deflect the gas stream, or a portion thereof, against the free liquid surface 12. Thus, in its course through this passage the gas stream is led over a free liquid surface and during its passage thereover at least a portion of the gas is deflected against that surface. The first stage of its treatment having thus been completed, the gas stream moves upwardly through the aperture 3 with the displaced liquid particles into the upper chamber and is, in the preferred practice of the invention, deflected or otherwise forced through the flowing liquid layer 10 which, as above explained, is continuously formed by the particles of liquid arising from the liquid body 11 through the aperture 3 and is continually returned to that body through the pipes 4. The means by which the gas is forced or directed through this liquid layer may take any convenient form such as baffles 7a which form with the walls of the box 1 a gas enclosure sealed by the extension of baffle edges 14 into the liquid layer as shown. From this enclosure the only method of gas escape under the forcing action of the blower is through the flowing liquid layer and thus the gas stream is forced through this layer being thus placed intimately in contact with the liquid of the layer. The paths of liquid flow and gas flow are, however, almost immediately divergent as the gas rises through the layer and into the upper levels of the chamber. Thus, the gas stream is led through, and in intimate contact with, a flowing liquid layer in the second stage of its treatment.

It will be noted that the gas stream in being drawn through the apertures 3 will be, for the moment of passage, intimately mixed with the particles of liquid being simultaneously lifted upwardly from the liquid body 11. While in the preferred form the gas stream is thereafter passed into the flowing liquid layer 10 as above described, this is not always necessary because of the cleansing action resulting from the mixture of the gas with the liquid particles in the course of their simultaneous passage through the apertures 3 and the passage of gas over the surface of the layer 10. Therefore, in a modified form of the invention the baffle edges 14 of the baffles 7a do not extend into the liquid layer 10 and the gas passes along the surface of said layer without actual entry therein except as may occur naturally as the result of the velocity of the gas.

The gas, from which the solid materials have now been substantially, if not completely, removed, is drawn from the surface of the liquid layer toward the exhaust port. At this point it may, if desired, be further treated to condense therefrom a portion or all of any liquid which it may carry as the result of its contact with the free liquid surface 12, the liquid particles rising through the aperture 3 and the liquid of the layer 10. Any convenient condensing means may be employed such as the simple baffles 7 which at once serve as condensing surfaces and also as means of impeding and changing direction of gas flow which furthers the condensing process. Liquid condensing on the surfaces of the baffles 7 returns by gravity to the layer 10 and thus remains in the liquid circuit.

The advantages of the type of apparatus just described are many, among them being the lack of moving parts or valves, the freedom from water pipes for constant water supply and the small amount of water used. Also the solid matter removed from the gas is delivered to the bottom of the lower compartment where it lies, without interfering with operation, until such time as it may be conveniently collected. I have found a unit such as described very useful in the collection of magnesium dust and grindings arising from the operation of polishing lathes and much superior for this purpose than collectors heretofore used which either consumed large quantities of water or presented explosion hazards. When thus used, the magnesium is collected under the water in the general manner above described. The contact between the magnesium and the water produces a small amount of hydrogen gas. To prevent collection of this gas during periods when the unit is not in operation, I provide a number of small holes in the partition 2. Such holes are illustrated at 13 in the accompanying drawing. My improved device and method also removes the dust to such extent as to eliminate the fire hazards present in other collectors and caused by accumulation of unremoved magnesium dust in the exhaust stack of the collector.

In the practice of my novel method, other apparatus or devices than here shown and described may be used and modifications in the construction and arrangement of the apparatus here shown may be made without departure from the invention except as it is expressed in the appended claims.

I claim:

1. A method of separating solids from gas containing the same which includes creating an enclosed gas stream, deflecting at least a portion of said stream against the free surface of a liquid body and thereafter passing said stream through and in contact with a flowing layer of liquid in a path divergent to the direction of flow of said layer.

2. A method of separating suspended solids from a gas which includes forming a liquid circuit consisting of a liquid body having a free surface and a separate flowing liquid layer continuously created from and continuously returning to said body, forming a moving stream of said gas, flowing said gas stream over the free surface of said liquid body while deflecting at least a portion of said stream against said free surface and thereafter passing the gas stream through and in contact with the flowing liquid layer in a path divergent to the direction of flow of said layer.

3. A method of separating suspended solids from a gas which includes forming a liquid circuit consisting of a liquid body having a free surface and a separate flowing liquid layer continuously created from and continuously returning to said body, forming a moving stream of said gas, flowing said gas stream over the free surface of said liquid body while deflecting at least a portion of said stream against said free surface, thereafter passing the gas stream through and in contact with the flowing liquid layer in a path divergent to the direction of flow of said layer and removing from said gas at least a portion of the liquid carried thereby and returning the removed liquid to said circuit.

4. A method of separating suspended solids from a gas which includes forming a liquid circuit consisting of a liquid body having a free surface and a separate flowing liquid layer continuously created from and continuously returning to said body, forming a moving stream of said gas, flowing said gas stream over the free surface of said liquid body while deflecting at least a portion of said stream against said free surface, thereafter passing the gas stream through and in contact with the flowing liquid layer in a path divergent to the direction of flow of said layer and removing from said gas at least a portion of the liquid carried thereby.

5. In a gas treating device, a gas passage, a liquid body having a free liquid surface forming a side of said passage, means disposed in the passage to deflect gas against said free surface, a separate layer of flowing liquid and means for causing gas to move through said passage and thereafter to move, in directions divergent to the layer flow, into and through said layer and in contact therewith.

6. In a gas treating device, a gas passage, a liquid body having a free liquid surface forming a side of said passage, means disposed in the passage to deflect gas against said free surface, a separate layer of flowing liquid, a liquid removing means and means to cause gas to first move through said passage, to secondly move, in directions divergent to the layer flow, into and through said layer and in contact therewith and to finally move through said liquid removing means.

7. In a gas treating device, a lower compartment, a body of liquid disposed in said compartment and having a free liquid surface which in operative position forms with the compartment walls a gas passage, means disposed in said passage to deflect gas against said free liquid surface, a gas delivery port communicating with said passage, an upper chamber communicating with said compartment and said passage, means for continuously displacing a portion of said body of liquid to said upper chamber and means for continuously returning said displaced liquid to said body of liquid whereby a layer of flowing liquid is formed and maintained in the lower level of the upper chamber, a discharge port in the upper levels of said chamber in communication with the space above said layer, means for causing flow of gas from the delivery port through said gas passage into said upper chamber and through said discharge port and means disposed in the path of gas flow to cause said gas to pass into and through said liquid layer after it has left said passage and before it has reached said discharge port.

8. A device according to claim 7 in which the means for displacing liquid into the upper chamber and the means for causing gas flow are identical.

9. In a gas treating device, in combination, a gas passage bounded on one side by a liquid surface, a flowing layer of liquid, means for moving a gas stream through said passage and then, at a direction divergent to the layer flow, through said layer in contact with the liquid thereof, and means disposed in said gas passage for deflecting at least a portion of said gas stream against said liquid surface.

ROBERT D. GUNN.